United States Patent [19]

Demaiter et al.

[11] Patent Number: 4,730,721
[45] Date of Patent: Mar. 15, 1988

[54] TOBACCO HARVESTER

[76] Inventors: Leon J. Demaiter, R. R. #1; Gerard J. Demaiter, R. R. #1, both of Langton, Ontario, Canada, N0E 1G0.

[21] Appl. No.: 818,898

[22] Filed: Jan. 15, 1986

Related U.S. Application Data

[62] Division of Ser. No. 626,979, Jul. 2, 1984, abandoned.

[51] Int. Cl.⁴ .............................................. B65G 17/32
[52] U.S. Cl. ................................... 198/715; 198/801; 198/802
[58] Field of Search ............ 198/715, 801, 468.8, 198/474.1, 802; 414/422, 424, 507, 527; 187/16

[56] References Cited

U.S. PATENT DOCUMENTS

| | | | |
|---|---|---|---|
| 2,659,497 | 11/1953 | Verrinder | 198/801 X |
| 2,702,134 | 2/1955 | Alphin, Jr. | 56/27.5 |
| 2,704,158 | 3/1955 | Long | 56/27.5 |
| 2,828,002 | 3/1958 | Sawrie | 198/715 |
| 3,107,018 | 10/1963 | Mish, Jr. | 214/83.1 |
| 3,215,288 | 11/1965 | Long et al. | 214/5.5 |
| 3,258,141 | 6/1966 | Davis | 214/83.1 |
| 3,453,018 | 7/1969 | Love et al. | 296/5 |
| 3,834,137 | 9/1974 | Long | 56/27.5 |
| 4,066,176 | 1/1978 | Honeycutt | 214/43 |

FOREIGN PATENT DOCUMENTS

| | | | |
|---|---|---|---|
| 537348 | 2/1957 | Canada | 56/27.5 |
| 0022427 | 1/1981 | European Pat. Off. | 56/27.5 |
| 374719 | 4/1923 | Fed. Rep. of Germany | 198/801 |
| 291257 | 5/1928 | United Kingdom | 198/801 |
| 465544 | 5/1937 | United Kingdom | 198/801 |

Primary Examiner—Joseph L. Valenza
Assistant Examiner—Jonathan D. Holmes

[57] ABSTRACT

A harvester of the riding type for tobacco or other leaf crop plants grown in parallel rows. The harvester comprises a vehicle of suitable height and width to span several plant rows. Primers' stations are suspended from the vehicle at a height from the ground suitable for the harvesting of the crop plants. One station is provided for each row. The vehicle has a platform positioned above plant height for an operator who manually transfers harvested leaves to a container located on the platform from conveyors provided at each of the stations for raising the leaves to the platform. The conveyors are positioned to partially surround the container at evenly spaced locations in order to minimize the total distance moved by the operator between the conveyors and the container. The vehicle has a lifting device used to interchange the container, when full, with an empty container and to unload the containers at the end of a row of plants.

1 Claim, 16 Drawing Figures

1

TOBACCO HARVESTER

This is a division of application Ser. No. 626,979, filed July 2, 1984, now abandoned.

BACKGROUND OF THE INVENTION

I. Field of the Invention

This invention relates to harvesters for tobacco or other leaf crop plants. More particularly, the invention relates to harvesters of the riding type which carry workers (known as primers) who remove the leaves from the plants.

II. Discussion of the Prior Art

Fully automatic tobacco harvesters have been developed in recent years and the tobacco harvesting and curing process has been modified to accommodate the increased yields that have consequently been obtained. In particular, automatic harvesters carry large collection bins for the leaves and the curing kilns have been designed to accept such bins.

Despite this, it has been found that fully automatic harvesters are not entirely satisfactory. Although they improve yields, they cannot be as selective in leaf choice as a human primer and often damage the plants and leaves. There is therefore a need to return to the riding type of machine previously employed, but the efficiency of such machines is generally too low to make them compatible with the large bin techniques developed for the automatic harvesters.

Examples of the known riding type harvesters are disclosed in the following U.S. Pat. Nos. 3,107,018 issued on Oct. 15, 1963 to W. A. Mish, Jr.; 3,215,288 issued on Nov. 2, 1965 to W. R. Long, et. al.; 3,258,141 issued on Jun. 28, 1966 to W. E. Davis; 3,453,018 issued on Jul. 1, 1969 to J. D. Love et. al.; and 4,066,176 issued on Jan. 3, 1978 to Bass Honeycutt. An example of an automatic harvester is disclosed in U.S. Pat. No. 3,834,137 issued on Sept. 10, 1974 to W. R. Long.

OBJECT OF THE INVENTION

An object of the present invention is to provide a harvester of the riding type capable of carrying the large curing bins (referred to below as containers) and of filling such bins efficiently.

SUMMARY OF THE INVENTION

According to one aspect of the invention there is provided a harvester for tobacco or other leaf crops that are grown in substantially parallel rows, said harvester comprising: a vehicle of a suitable height and width to span a plurality of plant rows; a plurality of primers' stations suspended from said vehicle and located at a height suitable to allow priming of the crop leaves, at least one such station being provided for each said row; a platform on said vehicle above plant height for supporting a container for picked leaves and an operator for filling the container with said leaves; and a conveyor means at each station for raising leaves picked at said station to the platform for collection by the operator; wherein said conveyor means at the platform are positioned to partially surround said container at substantially evenly spaced locations in order to minimize the total distance moved by the operator between said conveyor means and said container.

According to another aspect of the invention there is provided a harvester for tobacco or other leaf crops that are grown in substantially parallel rows, comprising: a vehicle of a suitable height and width to span a plurality of rows; a plurality of primer's stations suspended from said vehicle and located at a height suitable for picking the crop leaves, at least one such station being provided for each said row; and means for conveying leaves picked at said stations to a container located on said vehicle; wherein the station(s) at at least one side of the vehicle is (are) supported by adjustable support means capable of moving laterally outwardly of the vehicle so that the effective overall width of the harvester can be varied by operation of said adjustable support means.

According to another aspect of the invention there is provided a vertical conveyor mechanism for use in a location of limited horizontal space, which comprises: a pair of baskets, each comprising a sling of flexible material supported at two opposite edges by a pair of parallel rods lying in a horizontal plane; means for vertically raising and lowering said baskets in vertical paths between upper and lower positions such that as one basket ascends, the other descends; and means for folding one of the baskets to an upright flattened condition in a region where the baskets pass each other by rotating the basket around its horizontally outer rod to lie in a vertical peripheral plane, thus allowing the baskets to be horizontally overlapping when in the upper and lower positions without the baskets colliding in said region where they pass.

According to another aspect of the invention there is provided a mechanism for lifting a pair of similar loads carried on a vehicle and for interchanging their positions, comprising: a vertical mast located on the vehicle between the loads, said mast being capable of being telescopically extended or retracted; an H-shaped frame comprising four arms and a cross member, the frame being rotatably mounted in a horizontal orientation on the top of said mast at the centre of said cross-member; connectors attached to each arm for attachment to the respective loads positioned directly therebelow on each side of said mast; means for extending or retracting said mast in order to raise or lower said frame and said loads attached thereto; and means for rotating said frame when in the raised position for interchanging the positions of said loads.

According to yet another aspect of the invention there is provided in a harvester for tobacco or other plants that are grown in parallel rows, and having a steering mechanism the provision of an automatic steering means comprising: an elongated, laterally-movable sensor extending generally horizontally from the front of the harvester; power steering means operated by said sensor for translating lateral movements of the sensor into corresponding movements of the steering mechanism of the vehicle; and means for disengaging the sensor to allow normal steering of the vehicle; wherein said sensor is of a lateral width approximately equal to that of the separation of the rows and is mounted at a sufficient vertical height on the harvester to contact the lower parts of the plants in said rows.

DESCRIPTION OF A PREFERRED EMBODIMENT

Figure 1:
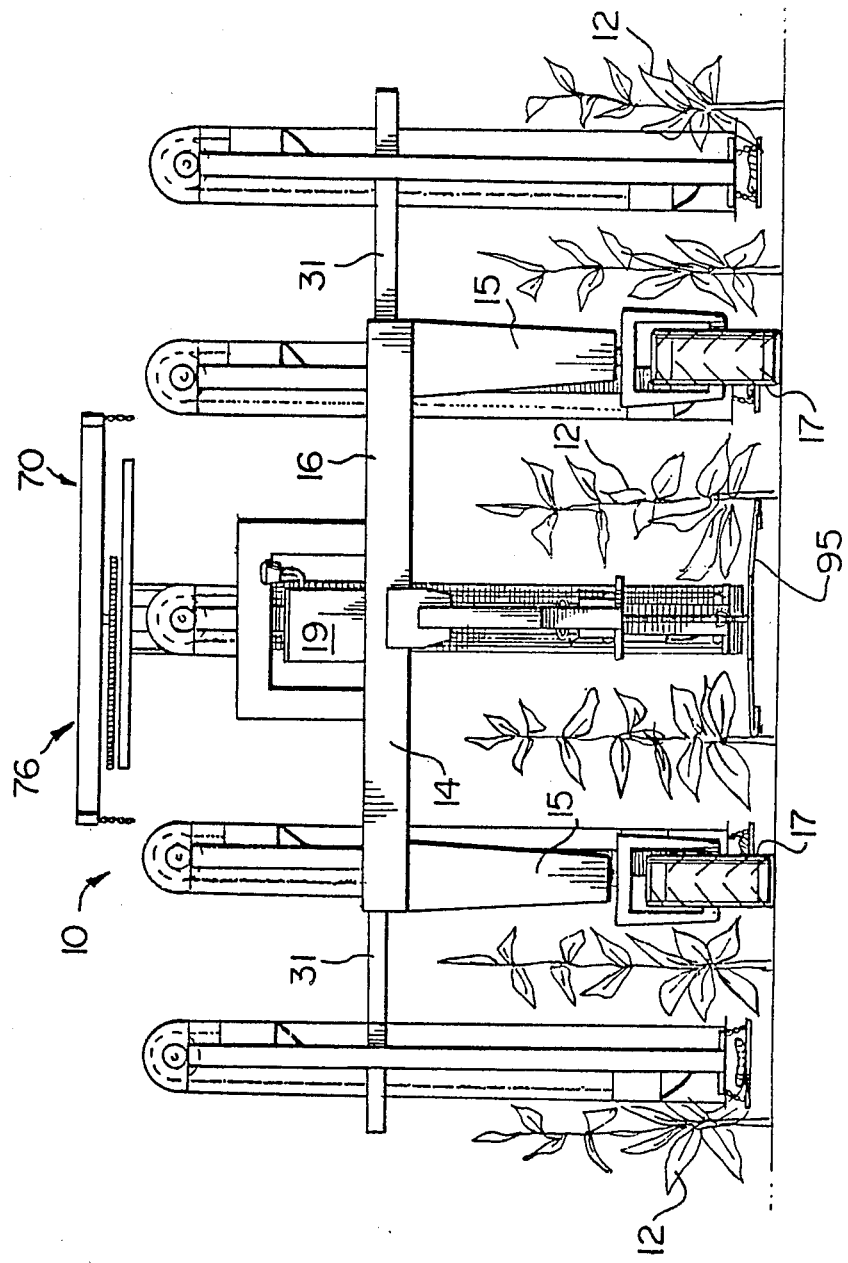
FIG. 1 is a front elevation of a harvester according to a preferred embodiment of the invention showing the outer primers' stations extended to their operational positions.

FIGS. 1 to 4 are general views of a preferred harvester identified generally by the reference numeral 10. The harvester is a self-propelled wheeled vehicle of sufficient height and width to span several rows of tobacco plants 12, so that leaves can be picked from several rows during a single pass of the harvester. In the embodiment shown, the harvester is capable of harvesting leaves from six rows simultaneously.

The harvester has a main frame 14 made up of elongated upright legs 15 which support a horizontal platform 16 at their upper ends and each have a wheel at their lower end. The harvester has two relatively small wheels 17 at the front and two relatively large wheels 18 at the rear. The small wheels 17 are steerable and the large wheels 18 are driven by a motor 19 through a conventional drive train (not shown). The motor is of sufficient power to propel the harvester and to drive a hydraulic system used for various functions to be described later. The motor 19 is preferably an internal combustion engine fueled by gasoline or diesel.

Since tobacco plants usually grow from four to six feet in height, the platform 16 is positioned at least six feet from the ground so that it can pass over the tops of mature plants without causing damage to the plants. The legs 15 and wheels are sufficiently narrow to pass between the plants of two adjacent rows without difficulty.

A number of primers' stations 20-25 are suspended below the platform 16 close to the ground at a height suitable for priming the plants. These stations each have a seat 27 for a primer who is consequently carried between the rows of plants 12 and can reach out to remove leaves. Each station 20-25 also has a conveyor mechansim 28 for transferring the picked leaves from the primer to an operator who stands on the platform 16. The operator on the platform then manually transfers the leaves from the conveyors 28 to a large container, known as a bin, 30 carried at the rear of the platform.

Figure 3:
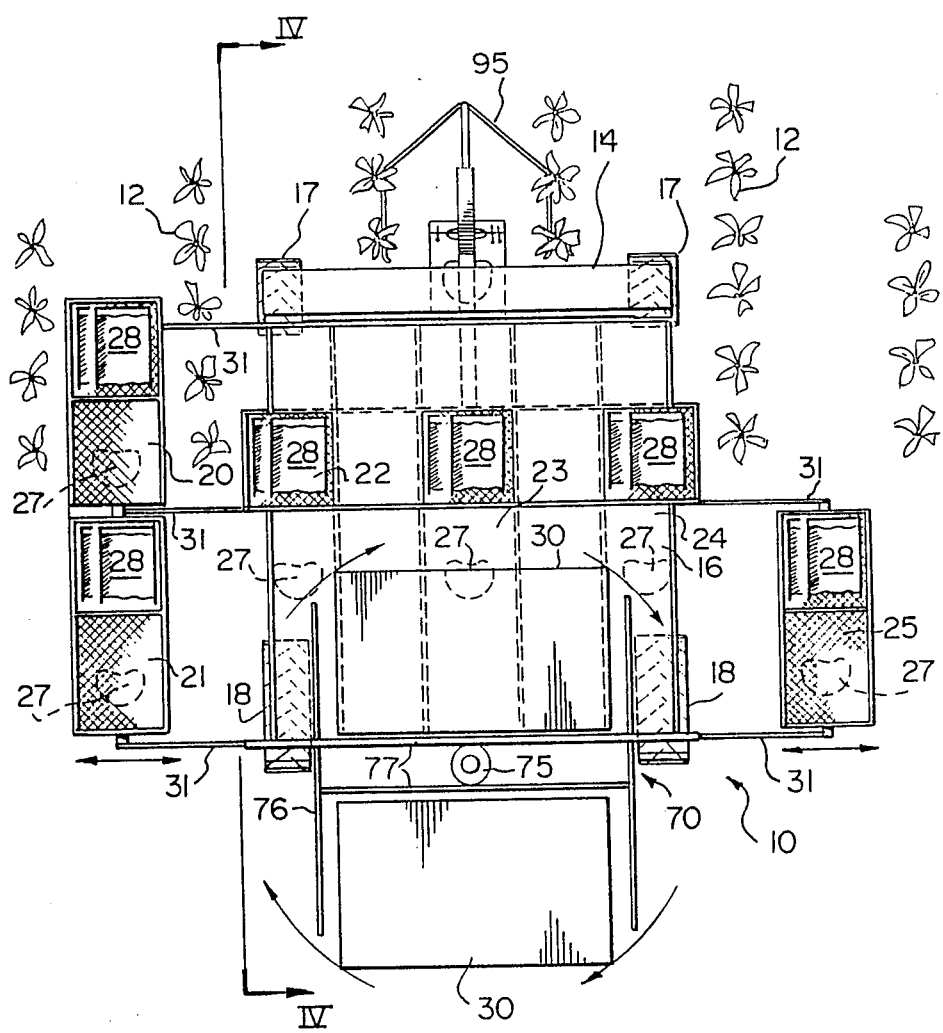
FIG. 3 is a simplified plan view of the harvester engaged in a harvesting operation.
Figure 4:
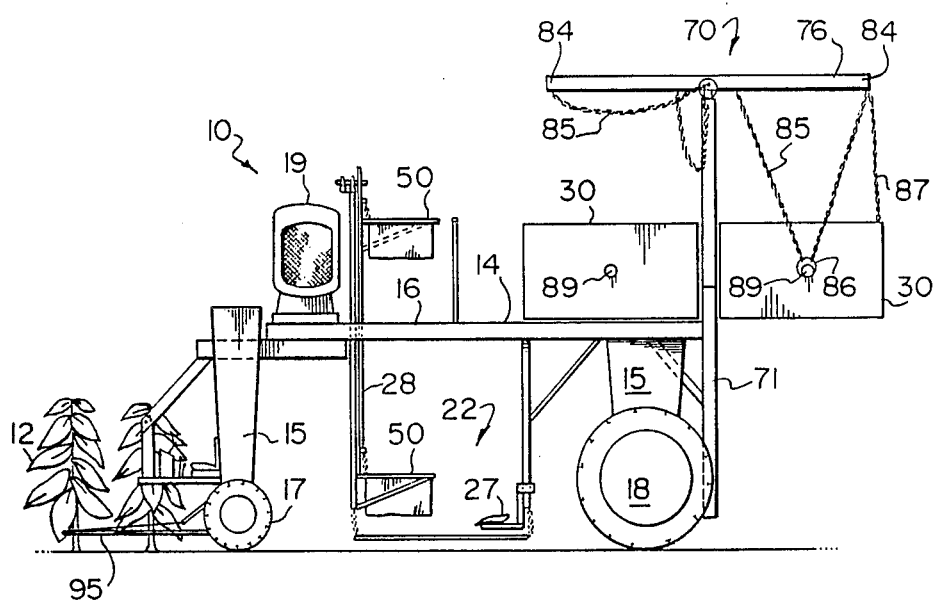
FIG. 4 is a side elevation taken on the line IV—IV shown in FIG. 3.

The positions of the primers' stations 20-25 are clearly shown in the plan view of FIG. 3. Three stations 22, 23 and 24 are provided in a straight line transversely of the harvester beneath the main frame 14 generally centrally between the front and rear wheels 17, 18. Three additional stations 20, 21 and 25, two at the left and one at the right, are carried by the harvester outwardly of the main frame 14. The two staions 20, 21 at the left are suspended from three arms 31 projecting outwardly from the main frame 14 at the height of the platform 16 and the single station 25 at the right is suspended from two similar arms 31. This enables the harvester to carry a total of six primers and to pick leaves from six rows of plants 12 simultaneously. Five of the primers pick from the row to the right and one, generally the one at the front on the extreme left hand side at station 20, picks from the row to the left.

It will be seen that the stations partially surround the bin 30. That is, they are roughly equally spaced from the front and sides of the bin 30 and from each other. Speaking very generally, these stations can be visualized as being arranged in a semicircle around the front of the bin. This positioning is important because it minimizes the total distance the operator has to move on the platform as he or she takes the leaves from the conveyors 28 and places them in the bin 30. As a result, it is found that all of the conveyors can be emptied quickly and efficiently by a single operator, even when the harvester is working at full capacity.

The exception to this generally semi-circular arrangement is the station 20 at the front on the extreme left, but even this station 20 is located as closely as possible to the bin 30 and does not deviate greatly from the semicircular arrangement. Thus the positioning shown, i.e. three stations 22, 23 and 24 arranged in a straight line transversely of the harvester, two outer stations 21 and 25 arranged on each side of the bin in a second transverse line just behind the first, and a sixth outer station 20 arranged slightly ahead of the central ones 22, 23 and 24, is found to optimize the efficiency of the leaf collection on the platform 16. At the same time, this arrangement of stations is also very compact in the longitudinal (front to rear) direction of the harvester so that the harvester can be kept short for ease of manoeuverability. It will be noticed that, in the longitudinal direction of the harvester, the stations 20-25 are all positioned within a space corresponding to the length of two such stations placed end to end. Indeed, the total length of the main frame 14 corresponds closely to two station lengths.

Although the harvester is relatively short front to rear, it is necessarily quite wide from side to side when engaged in harvesting because it spans four rows (to enable picking from six rows to take place). This translates to a width of about 20 feet and vehicles of such width are difficult to transport along roads and lanes. To overcome this problem, the harvester 10 has outer stations 20, 21 and 25 which can be moved laterally towards or away from the main harvester frame 14 to a certain extent. This can be seen by comparing FIG. 1, in which the outer stations are extended into the harvesting position, with FIG. 2, in which the outer stations are retracted to the transporting position. When the stations are in the positions shown in FIG. 2, the total width of the vehicle is about 13 feet. This contractability is made possible by supporting stations 20, 21 and 25 from arms 31 which are telescopically extensible from the main frame 14.

Figure 5A:
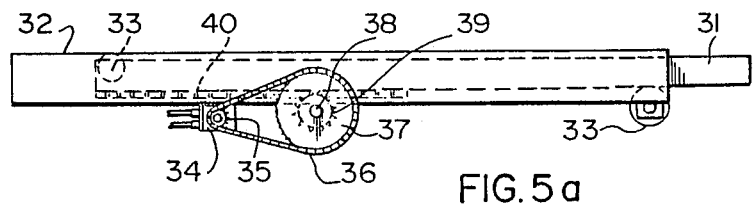
FIG. 5A is a detail on an enlarged scale showing the mechanism for laterally moving the outer primers' stations.

The mechanism for moving arms 31 is shown in FIG. 5A. Each arm 31 is slidable within a channel member 32 forming part of the main frame 14 of the harvester. Rollers 33 ensure that the movement is completely smooth and the arm 31 can properly support the weight of the station(s) suspended from it. A hydraulic motor 34 (e.g. an orbital motor) is fixed below the channel member 32. The motor 34 drives a sprocket 35 engaging an endless chain 36 which also engages a large toothed wheel 37. The shaft 38 of the toothed wheel passes transversely below the channel member 32 and a pinion 39 mounted on the shaft projects partially into the channel member 32, which is open from below, and engages a rack 40 on the underside of the arm 31. The rack may be, for example, a chain welded to the underside of the arm 31. Rotation of the sprocket 35 in either direction consequently causes the arm 31 to move laterally inwardly or outwardly, thereby moving the station(s) attached thereto.

The controls for the hydraulic motor 34 are preferably located at the feet of a primer in a station supported by the movable arm 31. For example, foot-operated controls may be located at stations 20 and 25. Positioning of the laterally movable stations by the primers is particularly advantageous for the following reasons.

Figure 5B:
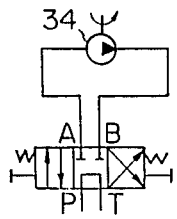
FIG. 5B is a schematic diagram showing the hydraulic circuitry of the mechanism of FIG. 5A.

The hydraulic circuitry for controlling the motor 34 is shown in FIG. 5B. The manner of operation of this circuitry is believed to be self-evident.

Tobacco is usually transplanted in the spring two rows at a time. The spacing between each row of a pair transplanted together tends to be very uniform, but the spacing between neighboring pairs of rows may vary by as much as 12 inches. If the positions of the primers stations are all fixed relative to each other, some of the primers find that the plants are beyond their reach for some of the time. By enabling the outermost primers to laterally adjust the positions of their stations as harvesting proceeds, the plants can be kept within reach of all of the primers all of the time. For this reason, not only are the outer stations 20, 21 and 25 laterally movable, but also station 24 suspended directly from the main frame 14 is made similarly laterally adjustable.

Stations 22 and 23 do not have to be laterally adjustable because the harvester is used in such a way that the primers in these stations always pick from rows that were planted together and which are thus uniform in spacing. Moreover, these rows are also used to guide the harvester (as will be explained later), so the primers at stations 22 and 23 are always optimally spaced from the plants.

Figure 2:
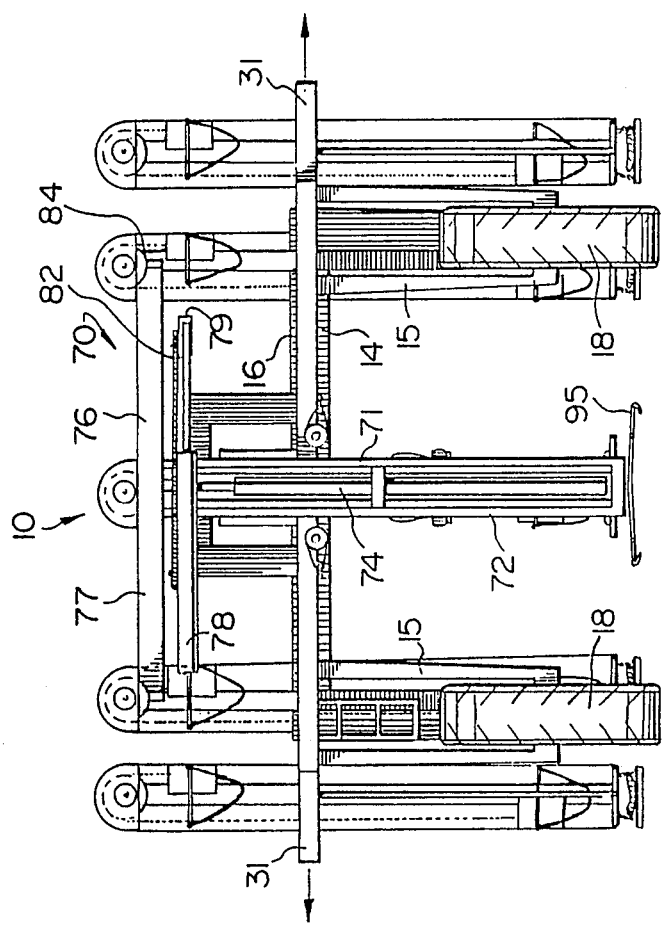
FIG. 2 is a rear elevation showing the outer stations retracted to the positions they occupy during transportation of the harvester.

Although not shown in detail in the drawings, platform 16 has a flat upper surface to support the operator and the bin 30. Because stations 20, 21 and 25 can move laterally as explained above, overlapping horizontal deck plates form the surface of the platform immediately above the arms 31. The plates slide over each other as the stations move, thus providing a suitable expandable platform surface to support the operator. The overlapping plates are preferably upwardly hingeable so they do not limit the extent to which the outer stations 20, 21 and 25 can be drawn in to the main frame 14 when the harvester is prepared for transportation as shown in FIG. 2.

The arms 31 are advantageously made detachable from the outer primers stations 20, 21 and/or 25 so that these stations can be eliminated if desired. This is sometimes desirable. For example, a four station machine supplies crop that requires harvesting 1 kiln per day whereas a six station machine supplies a crop that requires harvesting of 1½ kilns per day.

Figure 7A:
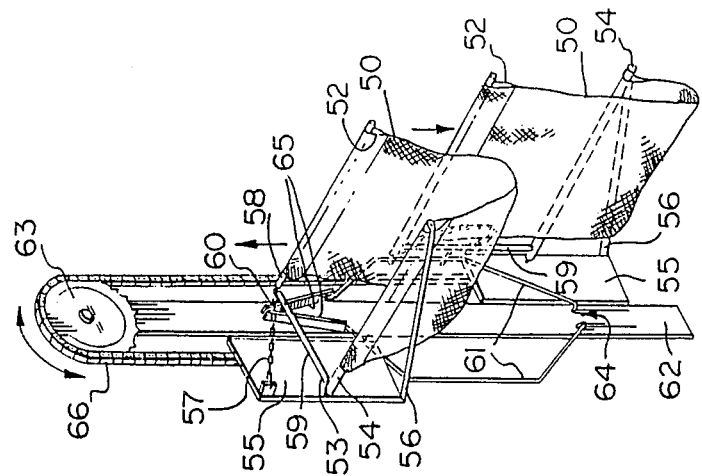
FIG. 6 and FIG. 7A are perspective views on an enlarged scale of a leaf conveyor mechansim used in the harvester.
Figure 6:
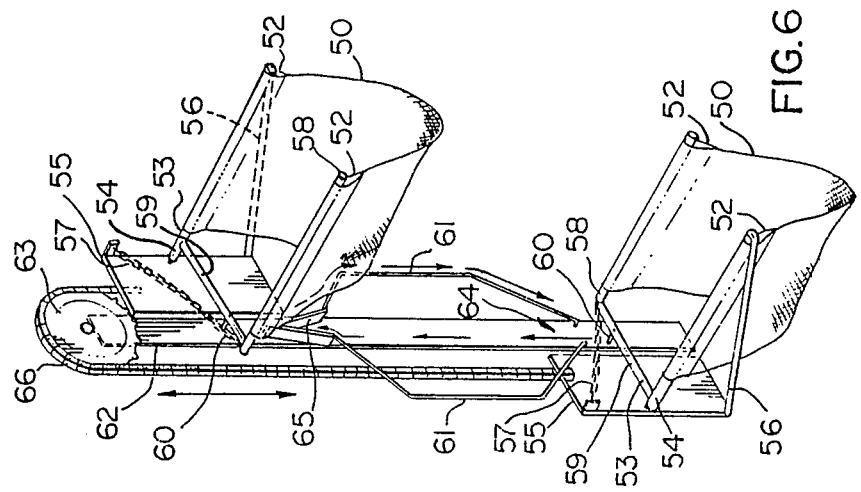

FIGS. 6 and 7A show the conveyor mechanism 28 provided at each station 20-25. A pair of baskets 50,50 are provided with vertically interchangeable positions so that one basket can be emptied by the operator on the platform 16 while the other is being filled by the primer below. The positions of the filled and emptied baskets can then be quickly interchanged so that priming can take place continuously. The baskets 50,50 should be as large as possible to reduce the frequency with which they have to be emptied, but the space available transversely of the harvester for each basket is limited because this is dictated by the distance between adjacent rows of plants 12. This arrangement shown in the drawings allows each basket 50 to occupy the maximum available width, but prevents the baskets from colliding when their positions are vertically interchanged by folding the empty descending basket to a vertically flat condition in which it easily passes the filled ascending basket.

The baskets 50,50 are simple rectangular slings of suitable flexible material such as canvas or plastic webbing. Loops 52 are formed at laterally opposite edges of the material and these are loosely supported by the arms of U-shaped members 53. U-shaped members 53 are formed by two longitudinal arms 54, 58 and a cross-piece 59. The laterally outermost arm 54 of each U-shaped member is roatably attached to one of a pair of plates 55,55. This is achieved by making the arm tubular and mounting it around a circular rod (not shown) fixed to the plate 55 by welding or bolting. A support arm 56 increases the support for the weight of the basket and prevents the tubular arm 54 from slipping off the free end of the circular rod. The U-shaped member is kept in the horizontal position by a chain 57 fixed at one end to the plate 55 and at the other end to the innermost arm 58 of the U-shaped member near the cross-piece 59.

Each U-shaped member 53 has a peg 60 extending in the direction of plate 55 from the cross-piece 59 near the point where it joins the innermost arm 58. The pegs are each positioned to contact one of a pair of guide rails 61,61 in the manner described below. The guide rails 61,61 are mounted on a vertical conveyor bracket 62. This bracket is in turn mounted on the supporting structure of the primers station or the main frame. A toothed wheel 63 is positioned at the top of the bracket 62 and a chain 66 passes over this wheel and has one of the plates 55,55 attached at each end. Rotation of the wheel, e.g. by a hydraulic motor controlled by the operator on the platform 16 causes baskets 50,50 to interchange their positions.

The baskets 50,50 are offset horizontally from each other by a slight distance which is just sufficient to allow the descending vertically flattened basket to pass the open ascending basket. The peg 60 on each U-shaped member 53 is offset slightly from the central axis of bracet 62 towards its pivoted arm 54. Guide rails 61,61 are mounted symmetrically on the bracket 62 with a small gap 64 between their lower ends on the central axis of the bracket. A corresponding gap at the upper ends of the guide rails 61,61 is closed by a pair of spring elements 65,65 fixed at their lower ends and free at their upper ends. The spring elements are arranged to form an inverted V. As a filled basket 50 ascends, peg 60 on its U-shaped member 53 passes through gap 64 between the lower ends of the guide rails 61,61. At the upper ends of the guide rails, the peg contacts one of the spring elements 65 (the one closest to its pivoted arm 54 since the peg is not centrally positioned as explained above) and the element yields to allow the peg to pass. The basket thus passes unimpeded to the uppermost position.

As an emptied basket descends from the uppermost position, the peg 60 on its U-shaped member 53 contacts one of the spring elements 65 (the one closest to its pivoted arm 54), but this does not yield because the orientation of the element cause it to contact the opposing spring element which consequently supports it. Further, the force required to rotate the descending basket is quite low because of its empty condition, so its peg 60 is unable to move the spring element and is forced to follow the outer contour of the guide rail 61 closest to its pivoted arm 54. The outer contour of the guide rail 61 is shaped to rotate the U-shaped member 53 of the descending basket upwardly around its pivoted arm 54 so that the basket becomes vertically flattened as shown in FIG. 7. When permitted by the outer contour of the guide rail, i.e., after the baskets have cleared each other, the U-shaped member 53 rotates to the horizontal position under the action of its own weight.

Although not shown in FIGS. 6 and 7A, the plates 55 run in suitable channels fastened to the bracket 62 and are restrained against horizontal motion in any direction.

Figure 7B:
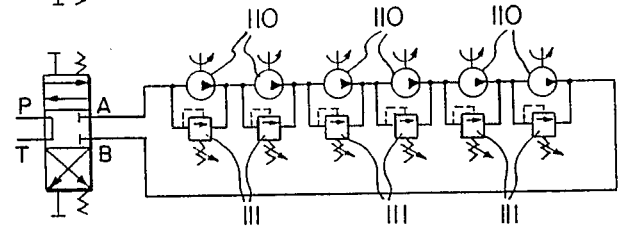
FIG. 7B shows the hydraulic circuitry used for raising and lowering six such conveyors as shown in FIGS. 6 and 7A.

The hydraulic circuitry for operating six such conveyors (one at each primer's station) is shown in FIG. 7B. Sprocket motors 110 drive the toothed wheels 63 and relief valves 111 allow all baskets to complete their movement before the oil flow shuts off, thereby keeping all baskets at an even elevation. The circuitry shown also results in the full baskets from each of the stations being raised at the same time, so the operator on the platform can easily compare the yields from each station and watch for problems, such as some leaves being missed by one of the primers.

Figure 8A:
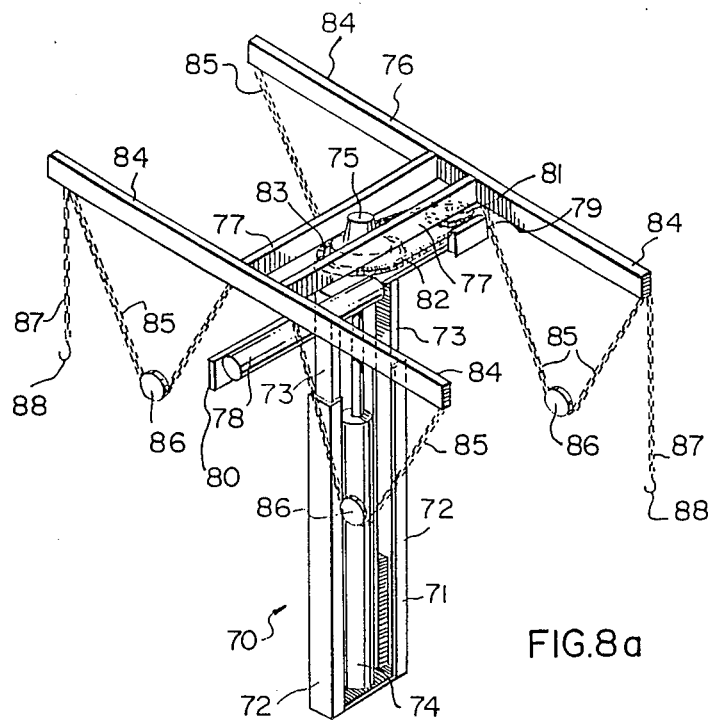
FIG. 8A is a perspective view of bin lifting and interchanging equipment used on the harvester.
Figure 8B:
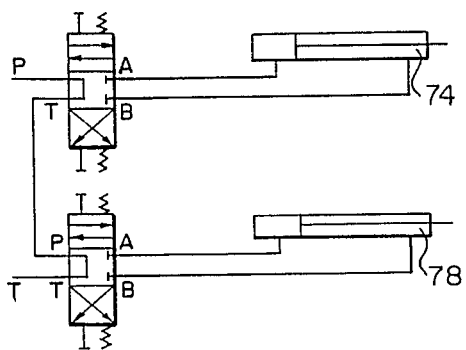
FIG. 8B shows the hydraulic circuitry for the lifting and interchanging equipment as shown in FIG. 8A.
Figure 11:
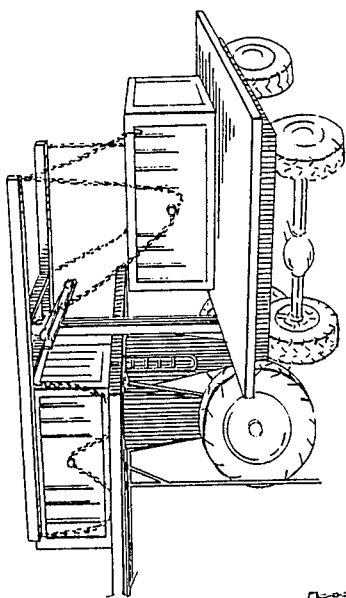
FIGS. 9 to 11 show the manner in which the bin lifting and interchanging equipment of FIG. 8A is used to lift, interchange and replace bins.
Figure 10:
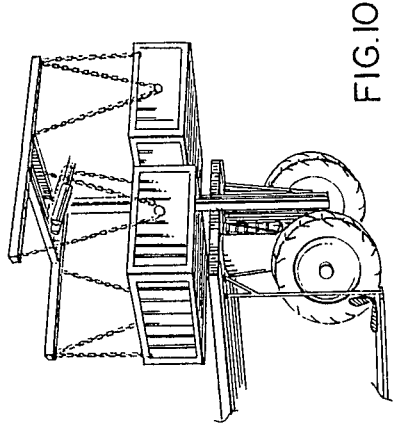
Figure 9:
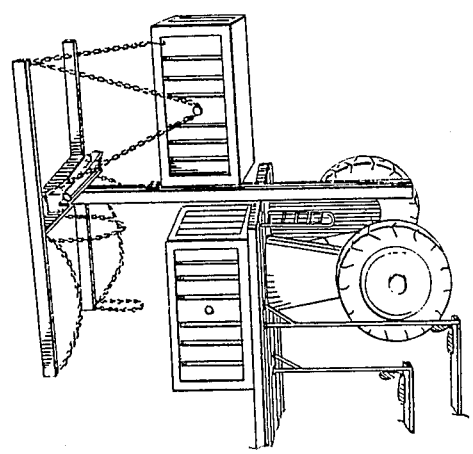

The harvester 10 carries not one but two containers or bins 30,30 to be filled by the operator on the platform 16. This is extremely advantageous because the first bin may be filled before the harvester has finished a row and it is only at the ends of the rows that a full bin can be unloaded and replaced with an empty bin. By carrying two bins, the first full bin can be interchanged for a second empty bin at any position in a row. A lift and interchange mechanism 70 for interchanging the bins is shown in FIG. 8A and its manner of operation is shown in FIGS. 9-11. FIG. 8B shows the hydraulic circuitry which controls two cylinders 74 and 78 which are described below.

The lift 70 has a telescopically extensible vertical mast 71 formed by vertical C channels 72,72 joined by cross members, and vertical flat bars 73,73 which roll in the C channels, joined by a separate set of cross-members. An hydraulic cylinder 74 acts between the upper ends of the flat bars and the lower ends of the C channels. A vertical pivot 75 is located at the upper end of the mast and this supports a horizontal H-shaped frame 76 centrally of its cross members 77,77. The frame 76 is consequently rotatable about the vertical axis of the mast 71. Rotation of the frame is controlled by a hydraulic cylinder 78 mounted on cross member 80 which in turn is mounted on frame 76. The movable end of the cylinder is attached to chain 82 by a bracket 79 which engages a toothed wheel 81 rotatably mounted on the end of cross member 80. The toothed wheel 81 engages the endless chain 82 which passes around a toothed wheel 83 rigidly fixed on the bottom of the frame 76. Extension or contraction of the cylinder 78 causes chain 82 to rotate and, since toothed wheel 83 is fixed to frame 76, the frame is caused to rotate in either one direction or the other. Rotation through 180° is possible in this way.

The free arms 84 of the frame 76 have chain loops 85 hanging therefrom. An enlarged eyelet 86 is located at the centre of each chain loop. A diametrically opposed pair of the arms 84 also have stabilizer chains 87 with hooks 88 at their free ends.

As can be seen from FIG. 9, one of the bins 30 rests on the back of the platform 16. This is the bin which is filled by the operator during harvesting. The other bin is supported by the rearwardly-extending pair of arms 84 at the back of the harvester. The enlarged eyelets 86 of each chain loop 85 from these arms engages a lifting boss 89 provided on opposite sides of the bin 30 and the stabilizer chain 87 is attached to a top edge of the bin to prevent undue tipping. During harvesting, the chains are removed from the bin supported by the platform to allow full access to the bin.

When the bin on the platform has been filled, the chains are attached to it and hydraulic cylinder 74 is operated to raise the H-frame 76 and consequently the bins 30 above the platfrom 16. Cylinder 78 is then operated to cause the H-frame to rotate through 180°, thus interchanging the positions of the two bins as shown in FIG. 10. The cylinder 74 is then operated to lower the bins sufficiently for the forward bin to rest on the platform. The filled bin then hangs at the rear and the empty bin is in position on the platform so that harvesting can continue.

At the end of a row, the filled bin is lowered to a waiting trailer 90 by further operation of the cylinder 74 (see FIG. 11) and the bin is taken away to the kiln for curing. An empty bin is secured in its place and raised to the operating position of FIG. 9 by further operation of the cylinder 74. Since the cylinder 74 is partially extended when the lift is in its normal operating position of FIG. 9, a safety latch is preferably provided to lock the mast 71 in this position.

The controls for the lift are preferably located at the front of the platform 16 so that the operator can stand well clear when activating the lift.

Figure 12A:
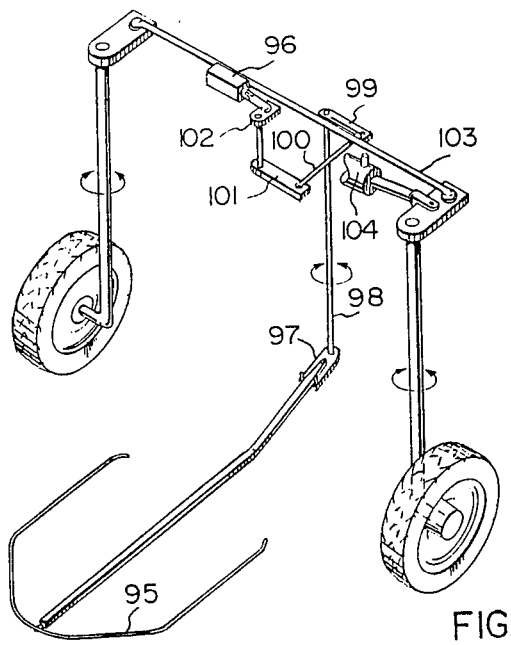
FIG. 12A is a simplified representation of an automatic steering device employed by the harvester.
Figure 12B:
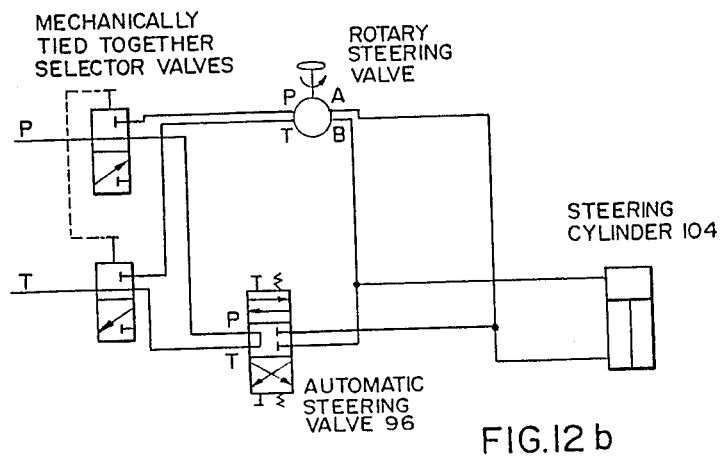
FIG. 12B shows the hydraulic circuitry for the automatic steering device of FIG. 12A.

FIG. 12A shows the important parts of an automatic steering system employed by the harvester, and FIG. 12B shows the controlling hydraulic circuitry. The system employs a sensor 95 mounted generally horizontally and extending forwardly from the front of the harvester close to ground level. The width of the sensor is approximately the same as the spacing of two adjacent plant rows, these being two rows that were planted at the same time and are thus uniformly spaced (approximately 46 inches) and parallel. The sensor 95 is easily moved from side to side by contact with the plants in the two rows, and thus the sensor is maintained parallel to the rows and centrally therebetween. The movements of the sensor are translated into equivalent movements of the steering wheels 17 by means of a power steering mechansim as explained below, so the sensor keeps the harvester moving parallel to the rows without the need for corrections by a driver, thus eliminating the need for a driver.

The automatic steering system readjusts the positions of the wheels 17 until they are parallel to the sensor 95. The sensor is linked to a hydraulic control 96 through several linkages 97 to 102. The hydraulic control 96 is mounted on a tie rod 103 of the steering system, and it controls the supply of hydraulic fluid to a steering cylinder 104. When the sensor 95 changes position as the harvester moves along the rows, this results in a change in position of a valve control spool (not shown) in the hydraulic control 96 as a result of translation of the sensor movements through the linkages 97 to 102. The steering cylinder 104 is consequently actuated and the tie rod 103 moves as a result, together with the housing of the hydraulic control 96. This continues until the spool is again centered in the housing when the wheels are parallel to the sensor, at which time the supply of hydraulic fluid to the steering cylinder 104 is terminated.

The linkage elements 97 to 102 preferably include an adjustment device which allows the sensor to be quickly and easily aligned with the driving wheels.

If necessary, movements of the senosr 95 can be made to translate into exaggerated movements of the steering wheels by amplifications in the linkages 97 to 102.

The sensor 95 tapers towards the front and is long enough at the sides to contact at least two plants of a row simultaneously. These features result in proper guiding of the sensor by the rows of plants.

The sensor 95 can be manually disengaged, e.g. by removing the sensor from the linkage bracket 97, and a rotary valve steering wheel engaged to permit normal steering of the harvester by a driver. This is necessary for transporting the harvester to and from the tobacco fields and for manoeuvering at the ends of the rows.

The above detailed description relates to a preferred embodiment of the invention. It will be readily apparent to persons skilled in the art that modifications to the embodiment could readily be made without departing from the spirit and scope of the invention as described herein.

We claim:

1. A vertical conveyor mechanism suitable for use in a location of limited horizontal space, which comprises:
   a pair of baskets, each comprising a sling of flexible material supported at two opposite edges by a pair of spaced parallel supporting rods lying, when said baskets are in an unflattened condition, in a substantially horizontal plane;
   means for vertically raising and lowering said baskets in substantially vertical paths between upper and lower positions such that as one basket ascends, the other descends, said substantially vertical paths partially overlapping such that said baskets would collide in a region where said baskets pass each other if they remained in said unflattened conditions; and
   means for folding one of said baskets to an upright flattened condition in said region where the baskets pass each other by rotating the one basket around its supporting rod lying horizontally most distant from the other of said baskets until its supporting rods lie in a generally vertical plane spaced horizontally away from the other of said baskets;
   said means for folding comprising a pair of angled vertical guide rails separated horizontally to leave a gap therebetween, a spring closure device at upper ends of said guide rails and a peg means associated with each basket, the peg means and guide rails being aligned such that the peg means of an ascending basket passes between said guide rails and through said spring closure device, whereas the peg means of a descending basket is constrained by said spring closure device to contact one of said pair of rails which thereby causes said basket to rotate in said region where said baskets pass.

* * * * *